United States Patent
Fripp et al.

(10) Patent No.: US 11,118,433 B2
(45) Date of Patent: Sep. 14, 2021

(54) HIGH ANGLE AND FRACTAL PRINTED SCREEN

(71) Applicant: Halliburton Energy Services, Inc., Houston, TX (US)

(72) Inventors: Michael Linley Fripp, Carrollton, TX (US); Samantha Ann Rogers, Farmers Branch, TX (US); Robyn Michelle Broniewski, Farmers Branch, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 488 days.

(21) Appl. No.: 15/751,280

(22) PCT Filed: Sep. 19, 2016

(86) PCT No.: PCT/US2016/052458
§ 371 (c)(1),
(2) Date: Feb. 8, 2018

(87) PCT Pub. No.: WO2018/052448
PCT Pub. Date: Mar. 22, 2018

(65) Prior Publication Data
US 2020/0199979 A1      Jun. 25, 2020

(51) Int. Cl.
*E21B 43/08* (2006.01)
(52) U.S. Cl.
CPC .......... *E21B 43/082* (2013.01); *E21B 43/086* (2013.01)
(58) Field of Classification Search
CPC .............................. E21B 43/082; E21B 43/086
See application file for complete search history.

(56) References Cited

U.S. PATENT DOCUMENTS

| | | | |
|---|---|---|---|
| 3,173,488 A * | 3/1965 | Rensvold | E21B 43/082 166/228 |
| 4,133,379 A | 1/1979 | Nuzman et al. | |
| 5,980,745 A | 11/1999 | Voll et al. | |
| 6,655,481 B2 | 12/2003 | Findley et al. | |
| 2004/0149435 A1 | 8/2004 | Henderson | |
| 2008/0217002 A1 * | 9/2008 | Simonds | E21B 43/084 166/230 |
| 2009/0057205 A1 | 3/2009 | Schulte, Jr. et al. | |
| 2010/0193254 A1 | 8/2010 | Lind et al. | |
| 2017/0050241 A1 * | 2/2017 | Thomas | C22C 1/0475 |

FOREIGN PATENT DOCUMENTS

WO    2016-144288 A1    9/2016

OTHER PUBLICATIONS

International Search Report and Written Opinion for International Application PCT/US2016/052458 issued by the Korean Intellectual Property Office dated Jul. 5, 2017, 17 pages.
Kaandorp, J.A., "Modelling growth forms of the sponge Haliclona oculata (Porifera, Demospongiae) using fractal techniques", Marine Biology, 1991, vol. 110, Issue 2, pp. 203-215.

* cited by examiner

*Primary Examiner* — D. Andrews
(74) *Attorney, Agent, or Firm* — Haynes and Boone, LLP

(57) ABSTRACT

A screen assembly for a production tool, the screen assembly including a tubular member defining an interior passageway; and a plurality of flow paths defined by the tubular member, the plurality of flow paths forming a screen portion that permits fluid flow through the screen portion and into the interior passageway; wherein the plurality of flow paths form a fractal flow network.

16 Claims, 9 Drawing Sheets

HIGH ANGLE AND FRACTAL PRINTED SCREEN

TECHNICAL FIELD

The present disclosure relates generally to subsurface equipment that is at least partially manufactured using additive manufacturing, such as 3D printing, and more specifically, to a high angle and fractal printed screen.

BACKGROUND

In the process of completing an oil or gas well, a tubular is run downhole and used to communicate produced hydrocarbon fluids from the formation to the surface. Typically, this tubular is coupled to a screen assembly that controls and limits debris, such as gravel, sand, and other particulate matter, from entering the tubular as the fluid passes through the screen assembly.

The screen assembly generally includes a filter in the form of a screen, which has multiple entry points at which the produced fluid (liquid and/or gas) passes through the screen. The screen is generally cylindrical and often includes a woven wire, a wrapped wire, or a cast part forming low-angle spaces or openings to receive the wellbore fluid and filter out debris within the wellbore fluid. These low-angle spaces or openings often results in low flow through the screen and low fine or residue holding in the screen.

The present disclosure is directed to high angle and fractal printed screen.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
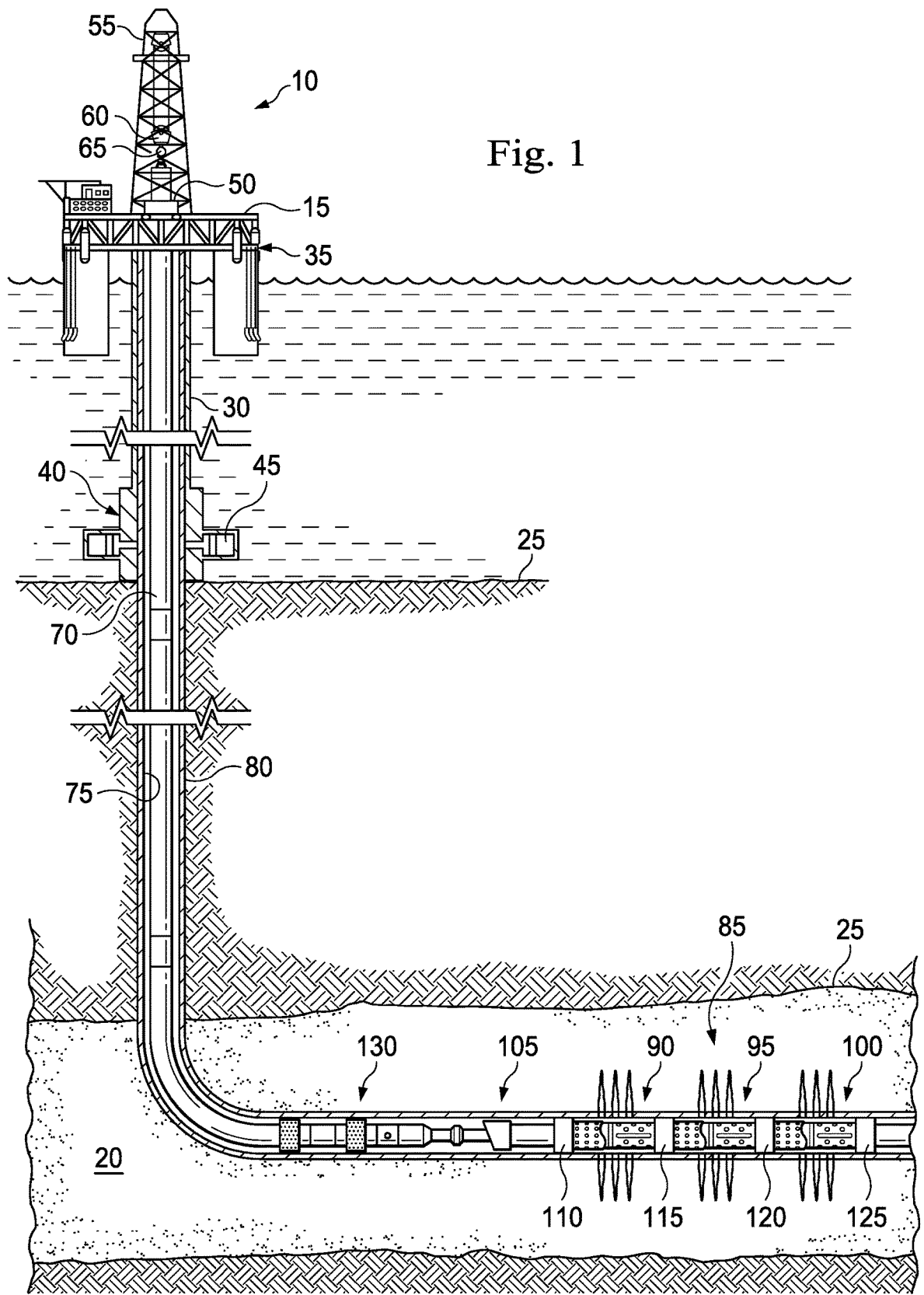
FIG. 1 is a schematic illustration of an offshore oil and gas platform operably coupled to a flow regulating system according to an embodiment of the present disclosure.

Illustrative embodiments and related methods of the present disclosure are described below as they might be employed in a high angle and fractal printed screen. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Referring initially to FIG. 1, an upper completion assembly is installed in a well having a lower completion assembly disposed therein from an offshore oil or gas platform that is schematically illustrated and generally designated 10. A semi-submersible platform 15 is positioned over a submerged oil and gas formation 20 located below a sea floor 25. A subsea conduit 30 extends from a deck 35 of the platform 15 to a subsea wellhead installation 40, including blowout preventers 45. The platform 15 has a hoisting apparatus 50, a derrick 55, a travel block 56, a hook 60, and a swivel 65 for raising and lowering pipe strings, such as a substantially tubular, axially extending tubing string 70.

A wellbore 75 extends through the various earth strata including the formation 20 and has a casing string 80 cemented therein. Disposed in a substantially horizontal portion of the wellbore 75 is a lower completion assembly 85 that includes at least one flow regulating system, such as flow regulating system 90 or flow regulating system 95 or 100, and may include various other components, such as a latch subassembly 105, a packer 110, a packer 115, a packer 120, and a packer 125.

Disposed in the wellbore 75 at a lower end of the tubing string 70 is an upper completion assembly 130 that couples to the latch subassembly 105 to place the upper completion assembly 130 and the tubing string 70 in communication with the lower completion assembly 85.

Even though FIG. 1 depicts a horizontal wellbore, it should be understood by those skilled in the art that the apparatus according to the present disclosure is equally well suited for use in wellbores having other orientations including vertical wellbores, slanted wellbores, multilateral wellbores or the like. Accordingly, it should be understood by those skilled in the art that the use of directional terms such as "above," "below," "upper," "lower," "upward," "downward," "uphole," "downhole" and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIG. 1 depicts an offshore operation, it should be understood by those skilled in the art that the apparatus according to the present disclosure is equally well suited for use in onshore operations. Further, even though FIG. 1 depicts a cased hole completion, it should be understood by those skilled in the art that the apparatus according to the present disclosure is equally well suited for use in open hole completions.

Figure 2:
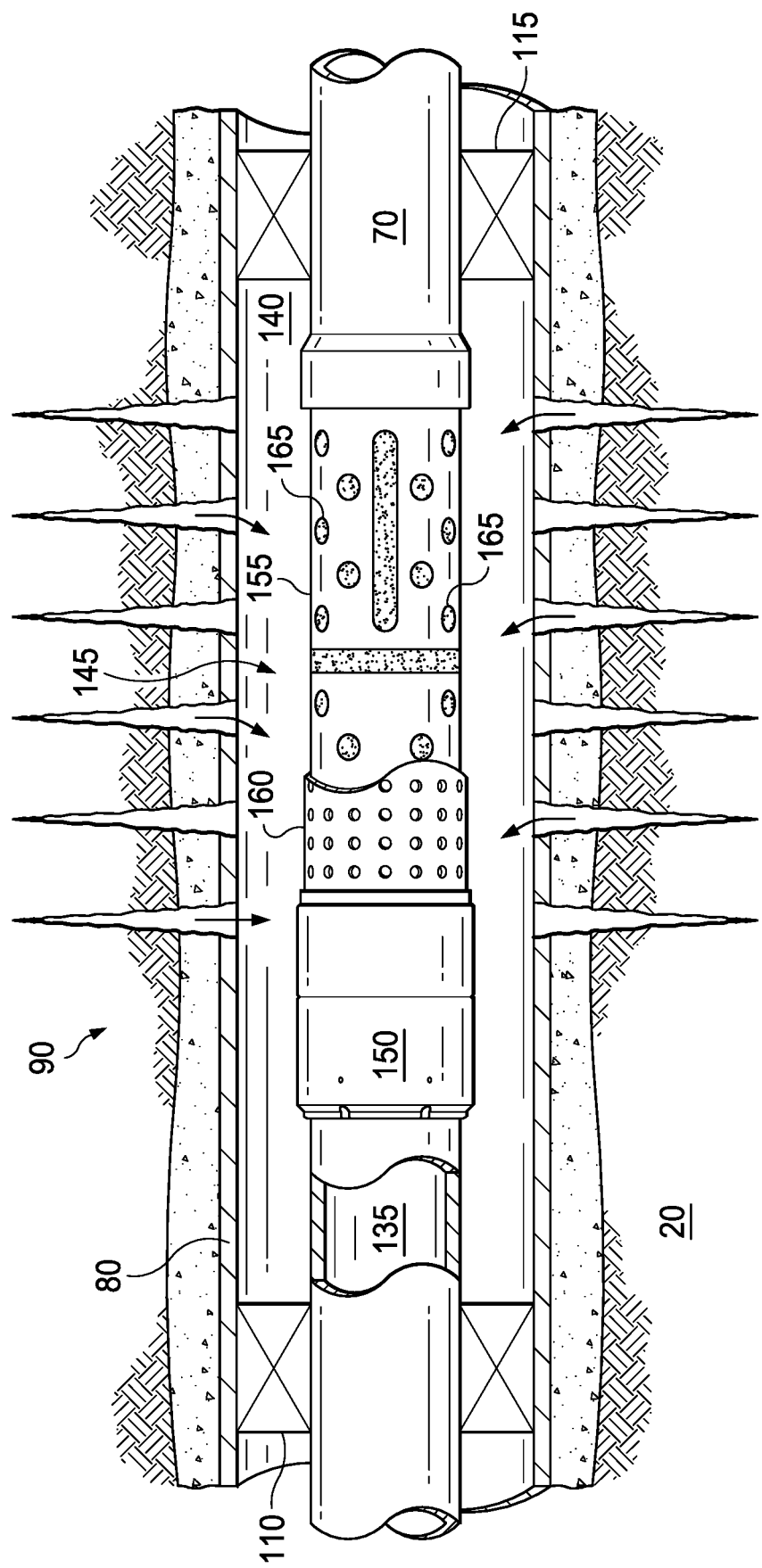
FIG. 2 illustrates a cut-out, side view of the flow regulating system of FIG. 1, according to an exemplary embodiment of the present disclosure.

FIG. 2 illustrates the flow regulating system 90 according to an exemplary embodiment. The flow regulating system 90 regulates flow of a fluid from the formation 20 to an interior flow passage 135 of the tubing string 70 (such as a production tubing string, liner string, etc.). As shown, an annulus 140 is formed radially between the tubing string 70 and the casing string 80. The fluid flows from the formation 20 into the interior flow passage 135 through the flow regulating system 90. The flow regulating system 90 generally includes a screen assembly 145 and an inflow control device ("ICD") 150, which may include an autonomous inflow control device ("AICD"), an inflow control valve ("ICV"), autonomous inflow control valve ("AICV"), and/or a traditional passive inflow control device. The screen assembly 145 prevents or at least reduces the amount of debris, such as gravel, sand, fines, and other particulate matter, from entering the interior flow passage 135. In one or more embodiments, the fluid passes through the screen assembly 145 then flows through the ICD 150 and into the interior flow passage 135 for eventual production to the surface, while in other embodiments, the fluid passing through the screen assembly 145 may flow directly to the interior flow passage 135 (without traveling through the ICD 150). The screen assembly 145 may include an elongated tubular screen member 155 and a shroud 160 concentrically disposed about the elongated tubular screen member 155. The elongated tubular screen member 155 may include one or more screens 165.

Figure 3:
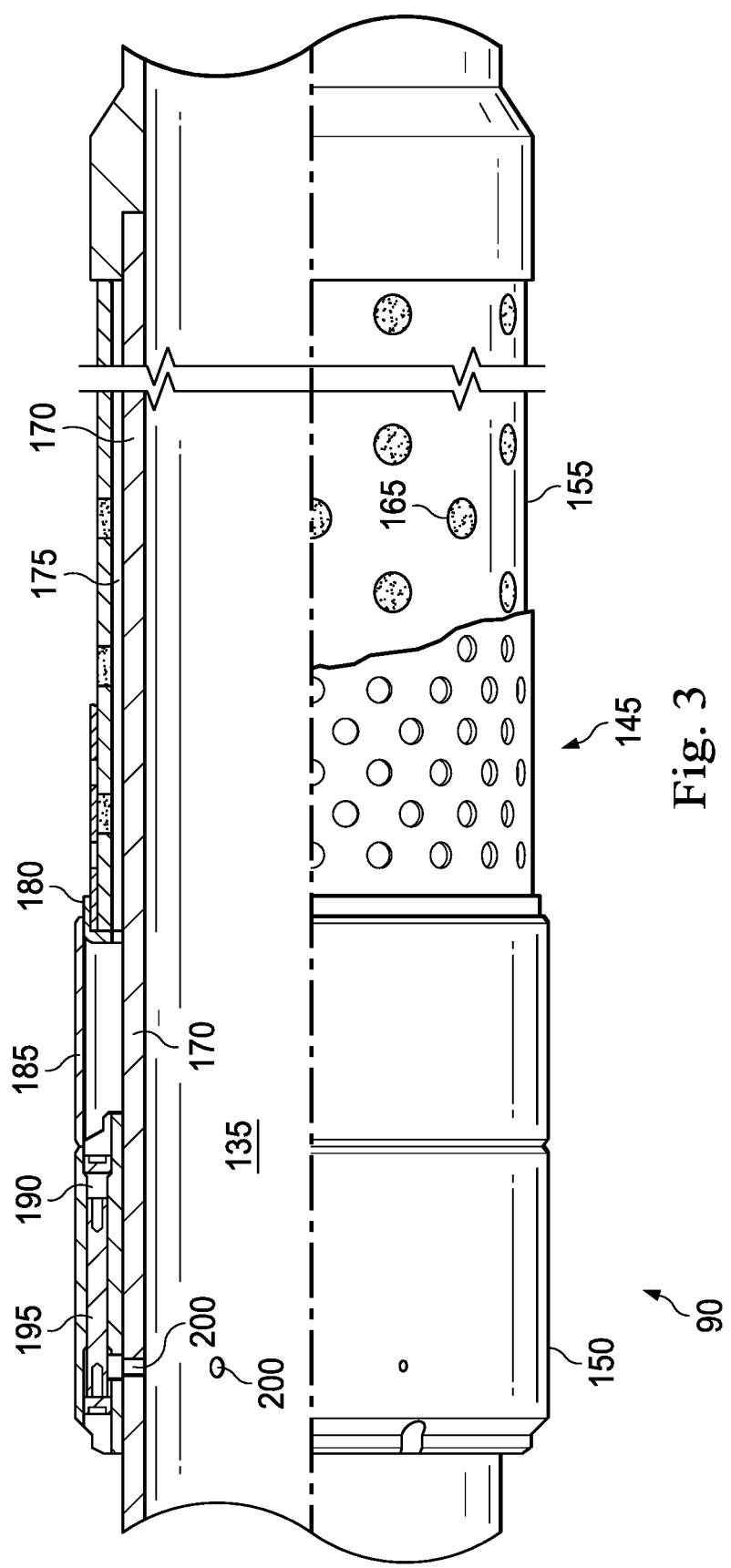
FIG. 3 illustrates a partial sectional view of the flow regulating system of FIG. 2, according to an exemplary embodiment of the present disclosure, the flow regulating system including a tubular screen.

FIG. 3 illustrates a more detailed view of the flow regulating system 90 according to an exemplary embodiment. In one or more embodiments, the screen assembly 145 of the flow regulating system 90 is the member 155 disposed on an inner tubular member or base pipe 170 so as define an exterior flow path or passage 175 between the member 155 and the base pipe 170. The passage 175 is formed to direct flow towards the interior flow passage 135. In one or more embodiments, the shroud 160 is disposed about the exterior surface of the member 155 so that at least a portion of the member 155 is covered by the shroud 160. An interface ring 180 is disposed about the exterior surface of the shroud 160 to secure the shroud 160 and the member 155 to the base pipe 170. In one or more embodiments, the interface ring 180 may be secured using a "shrink fit" to secure the shroud 160 and the member 155 to the base pipe 170. However, the shroud 160 may be attached to the base pipe 170 in a variety of ways, such as for example, using a friction fit, a threaded connection, a nut and a bolt, a weld, etc. A sleeve 185 is disposed in proximity to and/or about the exterior surface of the base pipe 170 and defines a portion of the passage 175. In some embodiments, the sleeve 185 is supported by the interface ring 180. The ICD 150 may be disposed adjacent or in proximity to the member 155 along the base pipe 170, preferably concentrically disposed about the exterior surface of the base pipe 170. In an exemplary embodiment, the ICD 150 is configured to be coupled to the sleeve 185. In an exemplary embodiment, the ICD 150 includes one or more tubular structures 190, which restrict the flow of the fluid from the passage 175 to an annular chamber 195 of the ICD 150. Although only one of the tubular structures 190 is visible in FIG. 3, a series of the tubular structures 190 may be arranged in parallel, and circumferentially spaced apart within the ICD 150. The tubular structures 190 are one example of flow restrictors which may be used in the ICD 150. In an exemplary embodiment, other types of flow restrictors may be used, such as for example chokes, orifices, nozzles, etc. Any type of flow restrictor may be used in keeping with the scope of this disclosure. In an exemplary embodiment, the fluid flows through the tubular structures 190 to the annular chamber 195. Thus, the tubular structures 190 provide for parallel flow of the fluid from the passage 175 to the annular chamber 195. The fluid flows from the chamber 195 and then inward via openings 200 in the base pipe 170 to the interior flow passage 135. The openings 200 are formed radially through the base pipe 170, which is configured (e.g., with threads at either end, etc.) for interconnection in the tubing string 70. Persons of skill in the art will appreciate that while the ICD 150 is described in some embodiments, in other embodiments, the ICD 150 need not be included. For example, the base pipe 170 may be provided with the openings 200 and the member 155 having the shroud 160 overlays the base pipe 170. When the ICD is included, the member 155 is longitudinally spaced apart from the openings 200 so the passage 175 extends longitudinally between the openings (i.e., the screens 165) of the member 155 and the openings 200 to guide the fluid flowing through the member 155 to the openings 200. Although the shroud 160 may have any shape or coverage of the member 155, in one or more exemplary embodiments, the shroud 160 is a generally cylindrical tubular forming an interior surface that contacts the exterior surface of the member 155. In one or more exemplary embodiments, the shroud 160 is composed of a metal. However, the shroud 160 may be composed of any metallic or non-metallic material and any combination thereof. In some embodiments, the base pipe 170, the shroud 160, and the ICD 150 is omitted from the screen assembly 145 and the fluid flows directly through the screens 165 and into the interior flow passage 135. Generally, the screens 165 allow fluid to pass through the screen 165. The screens 165 may be arranged in parallel, circumferentially spaced around the exterior surface of the member 155, extend along the length of the member 155, or extend around an outer circumference of the member 155.

Figure 4:
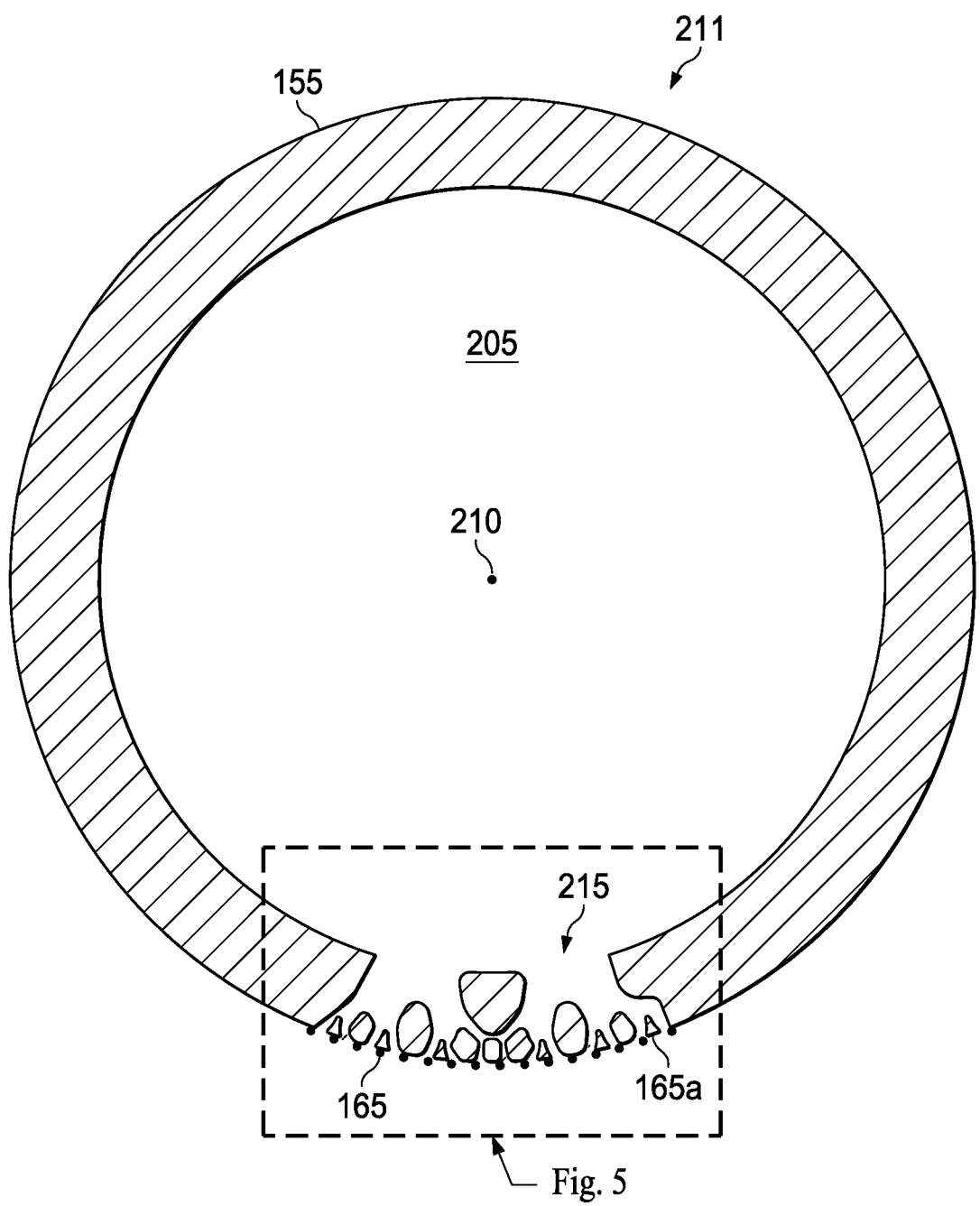
FIG. 4 illustrates a cross-section of tubular screen of FIG. 2, according to an exemplary embodiment of the present disclosure.
Figure 5:
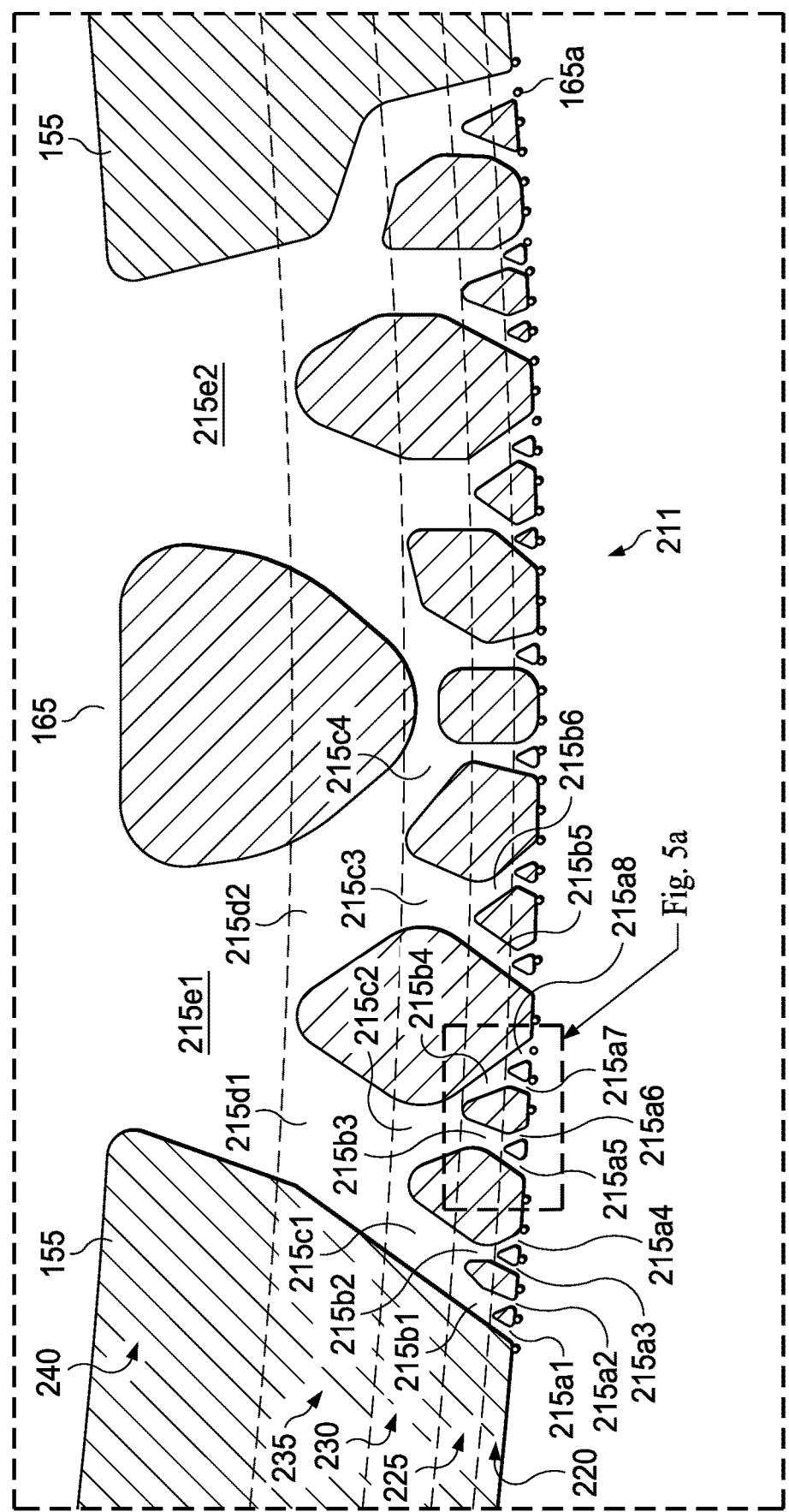
FIG. 5 is an enlarged portion of the tubular screen of FIG. 4, according to an exemplary embodiment of the present disclosure.
Figure 5A:
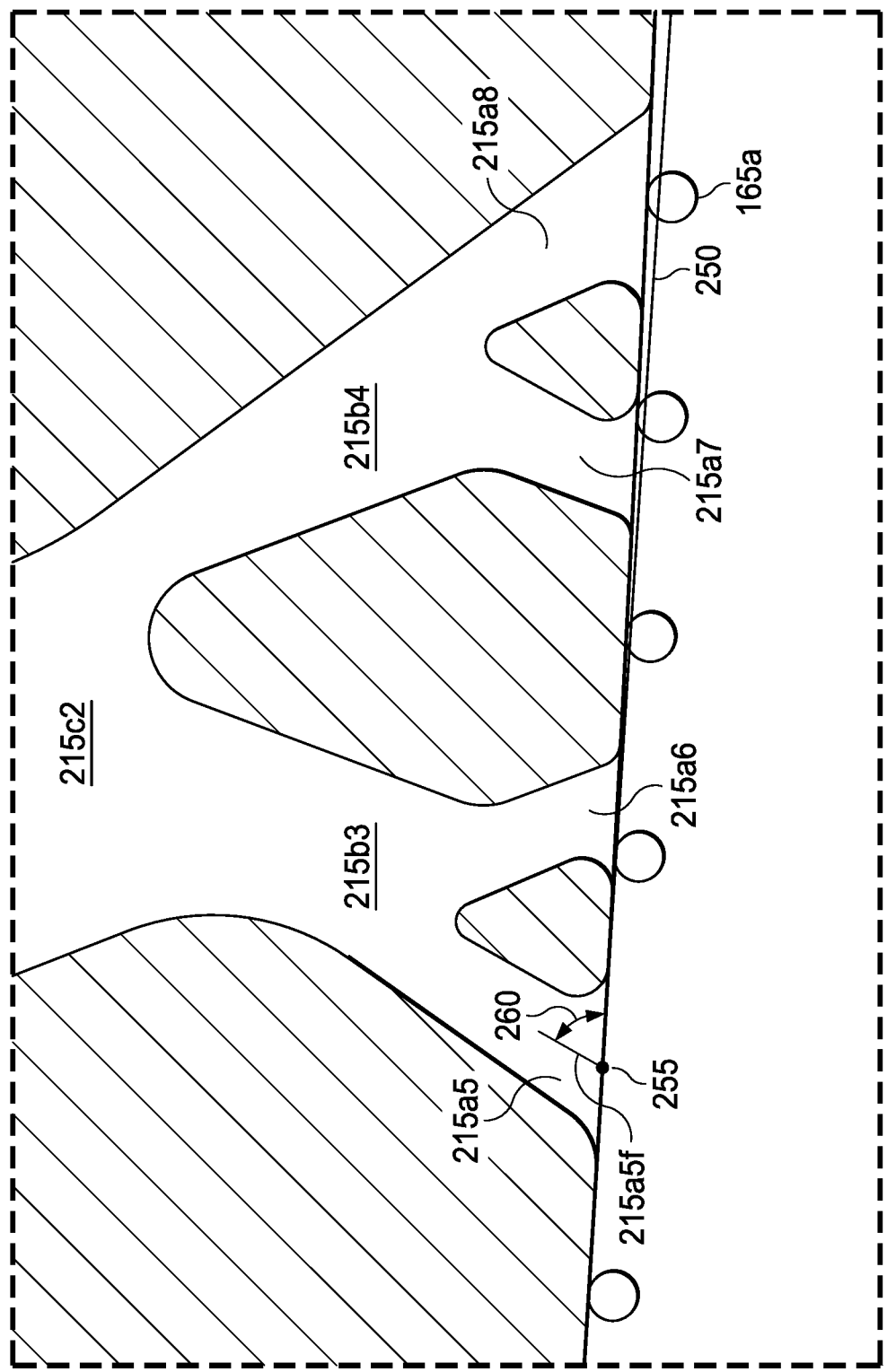
FIG. 5A is an enlarged portion of the enlarged portion of FIG. 5, according to an exemplary embodiment of the present disclosure.

FIG. 4 illustrates a cross-sectional view of the member 155 and FIGS. 5 and 5A illustrate an enlarged portion of the member 155 of FIG. 4. In an exemplary embodiment, the member 155 is tubular and defines an interior passageway 205 having a central longitudinal axis 210. When the base pipe 170 is omitted from the screen assembly 145, the interior passageway 205 forms the interior passage 135. The cross-sectional views of the member 155 shown in FIGS. 4 and 5 are cut along a plane 211 that is perpendicular to the central longitudinal axis 210 and corresponds with the plane cutting through the member 155 to form the cross-sectional views of FIGS. 4 and 5. The member 155 may include a plurality of flow paths 215 defined by the member 155, the plurality of flow paths 215 forming one of the screens 165. As shown in FIG. 5, the member 155 may form a fractal flow network, which may include multiple layers, or sections, such as a first section 220 that is at least partially defined by an exterior surface of the member 155; a second section 225 that extends between the first section 220 and a third section 230; the third section 230 extending between the second section 225 and a fourth section 235; the fourth section 235 extending between the third section 230 and a fifth section 240; and the fifth section 240 at least partially defined by an interior surface of the member 155. A plurality of flow paths, such as flow paths $215a1$, $215a2$, $215a3$, $215a4$, $215a5$, $215a6$, $215a7$, $215a8$, and so on, extends through the first section 220. Similarly, a plurality of flow paths, such as flow path $215b1$, $215b2$, $215b3$, $215b4$, $215b5$, and so on, extends through the second section 225; a plurality of flow paths, such as $215c1$, $215c2$, $215c3$, and $215c4$ extends through the third section 230; a plurality of flow paths, such as $215d1$, $215d2$, and so no extends through the fourth section 235; and a plurality of flow paths such as $215e1$ and $215e2$ extends through the fifth section 240. Each flow path in the plurality of flow paths has an inner circumference and a flow axis. Generally, the number of flow paths that extend through each of the first, second, third, fourth, and fifth sections decreases as the distance to the internal surface of the member 155 decreases, as smaller flow paths are consolidated into larger flow paths. That is, the number of flow paths in the fifth section 240 is generally less than the number of flow paths in the fourth section 235, the number of flow paths in the fourth section 235 is generally less than the number of flow paths in the third section 230, the number of flow paths in the third section 230 is generally less than the number of flow paths in the second section 225, and the number of flow paths in the second section 225 is generally less than the number of flow paths in the first section 220. Generally, smaller flow paths merge into larger flow paths. For example, flow paths $215a1$ and $215a2$ merge into flow path $215b1$; flow paths $215b1$ and $215b2$ merge into flow path $215c1$ and so on. Flow path $215a1$ and $215a2$ are in fluid communication with $215b1$; flow paths $215a3$ and $215a4$ are in fluid communication with flow path $215b2$; flow paths $215b1$ and $215b2$ are in fluid communication with flow path $215c1$; flow paths $215c1$ and $215c2$ are in fluid communication with flow paths $215d1$; flow paths $215d1$ and $215d2$ are in fluid communication with flow path $215e1$; and flow path $215e1$ is in fluid communication with the interior passageway 205. Generally, the dimensions of the inner circumferences of the plurality of flow paths are smallest towards the exterior surface of the member 155 and greatest towards the internal surface of the member 155. Thus, the inner circumferences increase as the distance to the internal surface of the member 155 decreases. The inner circumferences of flow paths that extend through a section of the member 155 may vary. For example, the inner circumference of flow path $215a1$ may be different than the inner circumference of flow path $215a2$. While the inner circumferences generally decrease the closer the flow paths are to the inner passageway, an inner circumference of the flow path $215a1$ may be greater than an inner circumference of the flow path $215b1$ or the inner circumference of the flow path $215a7$. While a flow path in the plurality of flow paths 215 may have a circular cross-section, the cross-section may form any type of shape.

In an exemplary embodiment, the member 155 has an outer circumference and the screen 165 has an entry threshold represented by dotted curve $165a$. At least a portion of the entry threshold $165a$ lies in a plane 250 that is perpendicular to the plane 211 and that intersects the outer circumference of the tubular member at a tangent point 255 at which the plane 250 is tangent to the outer circumference. At least one flow axis, such as flow axis $215a5f$ of the flow path $215a5$, passes through the tangent point 255 to intersect the plane 250. This intersection defines an angle 260 between the flow axis $215a5f$ of the flow path $215a5$ and the plane 250. In an exemplary embodiment, the angle 260 is greater than 30 degrees and less than 90 degrees so that the corresponding flow path $215a5$ facilitates filtering the fluid flowing through the plurality of flow paths 215. In an exemplary embodiment, the angle 260 is within a range of between 35 degrees and less than 90 degrees. In an exemplary embodiment, the angle 260 is an interior angle defined between the flow axis $215a5f$ of the flow path $215a5$ and the plane 250. While first, second, third, fourth, and fifth sections are described here, any number of sections may be identified in the tubular member 155, as the boundaries of the first, second, third, fourth, and fifth sections merely illustrate the location of a flow path relative to another flow path.

Figure 6:
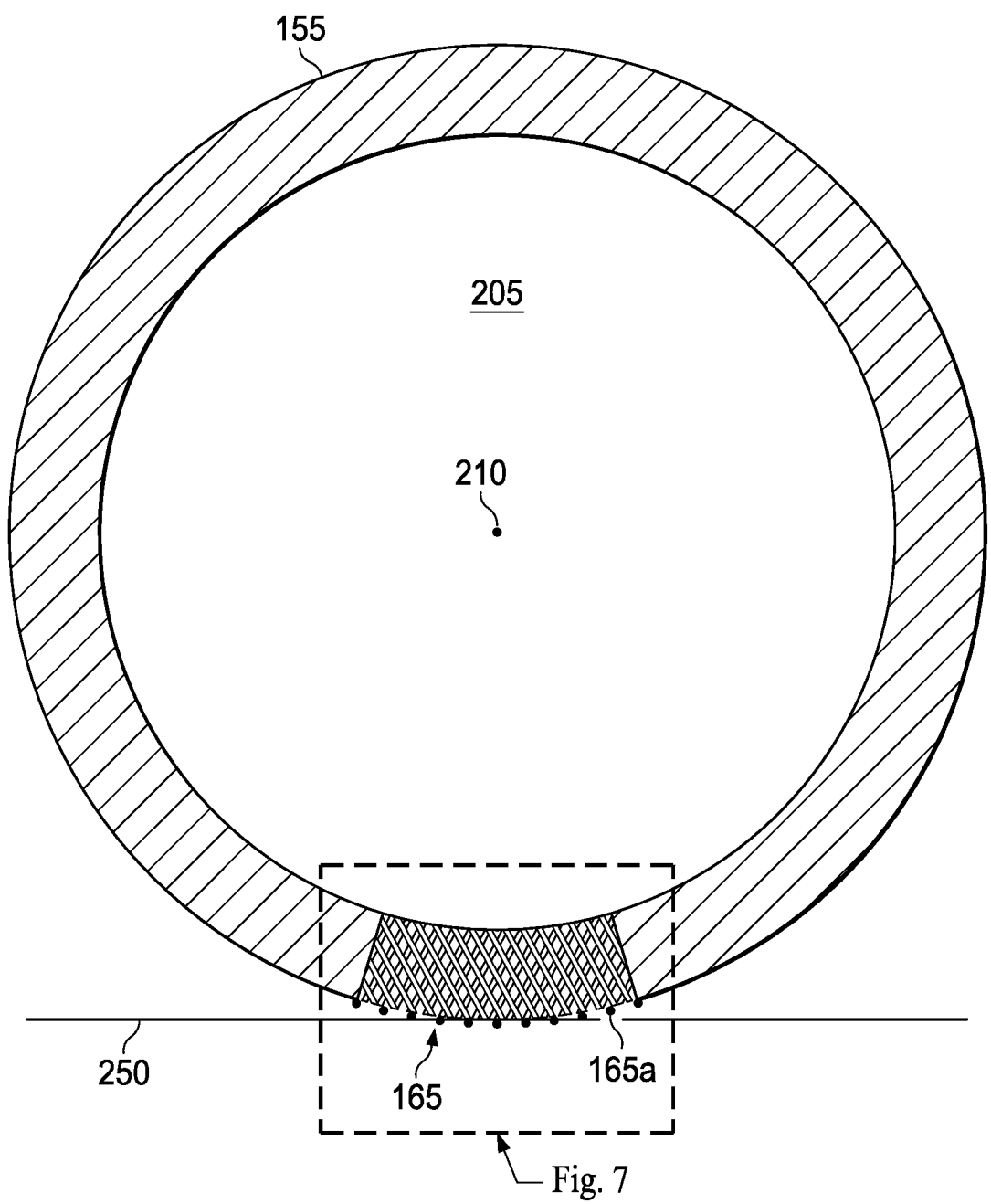
FIG. 6 illustrates a cross-section of another embodiment of the tubular screen of FIG. 3, according to exemplary embodiment of the present disclosure.
Figure 7:
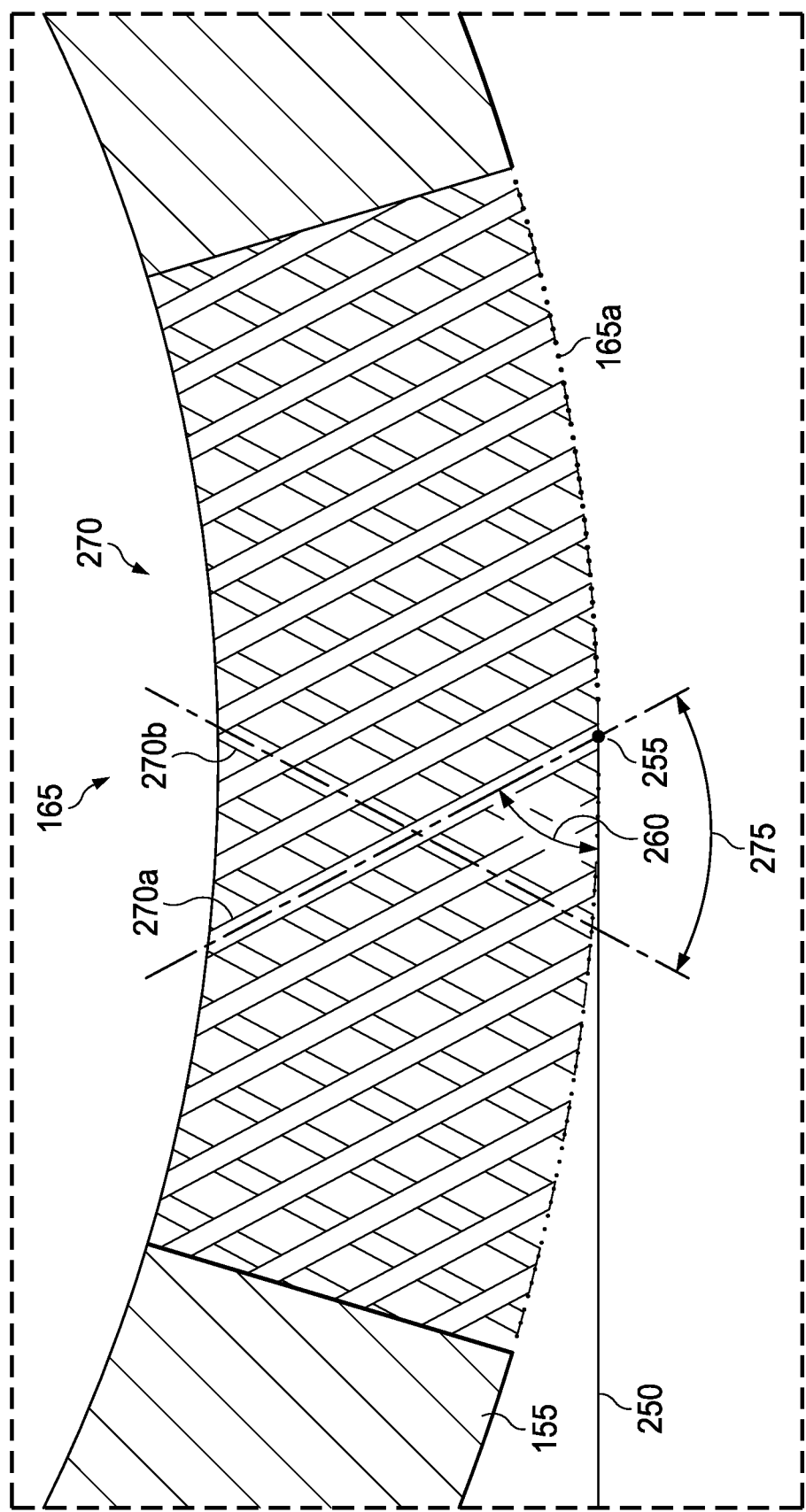
FIG. 7 is an enlarged portion of the tubular screen of FIG. 6, according to an exemplary embodiment of the present disclosure.

FIG. 6 illustrates a cross-sectional view of another embodiment of the member 155 of FIG. 2. FIG. 7 illustrates an enlarged portion of the member 155 of FIG. 6. In an exemplary embodiment, the screen 165 includes a plurality of acicular members 270 integrally formed in the member 155 with the outer circumference of the member 155 circumscribing the plurality of acicular members 270. Similar to the member 155 of FIGS. 4 and 5, at least a portion of the entry threshold $165a$ lies in the plane 250 that intersects the outer circumference of the member 155 at the tangent point 255 at which the plane 250 is tangent to the outer circumference. A first acicular member $270a$ in the plurality of acicular members 270 has a longitudinal axis that passes through the tangent point 255. The longitudinal axis of the first acicular member $270a$ intersects the plane 250 to define the angle 260 between the longitudinal axis of the first acicular member $270a$ and the plane 250; wherein the angle 260 is greater than 30 degrees and less than 90 degrees so that the first acicular member facilitates filtering the fluid flow by the plurality acicular members 270. A second acicular member $270b$ in the plurality of acicular members 270 has a longitudinal axis that passes through the longitudinal axis of the first acicular member $270a$ to form an angle 275. In an exemplary embodiment, the angle 275 is an interior angle defined between the longitudinal axis of the first acicular member $270a$ and the longitudinal axis of the second acicular member $270b$. In an exemplary embodiment, the angle 275 is greater than 10 degrees and less than 90 degrees.

Exemplary embodiments of the present disclosure may be altered in a variety of ways. For example, the screen 165 or a portion of the screen 165 may resemble a natural or organic structure, such as a sponge-like structure, a coral-like structure, etc. Additionally, the plurality of flow paths 215 and/or the plurality of acicular members 270 may be sized and spaced such that a honeycomb structure, a lattice structure, or the like is formed within the member 155.

In an alternate exemplary embodiment, it is not necessary for the wellbore 75 to be cased, cemented or horizontal as depicted in FIG. 1. It is also not necessary for the fluid to flow from the formation 20 to the interior flow passage 135 and/or 205, since in injection, conformance, or other operations, fluid can flow in an opposite direction.

Figure 8:
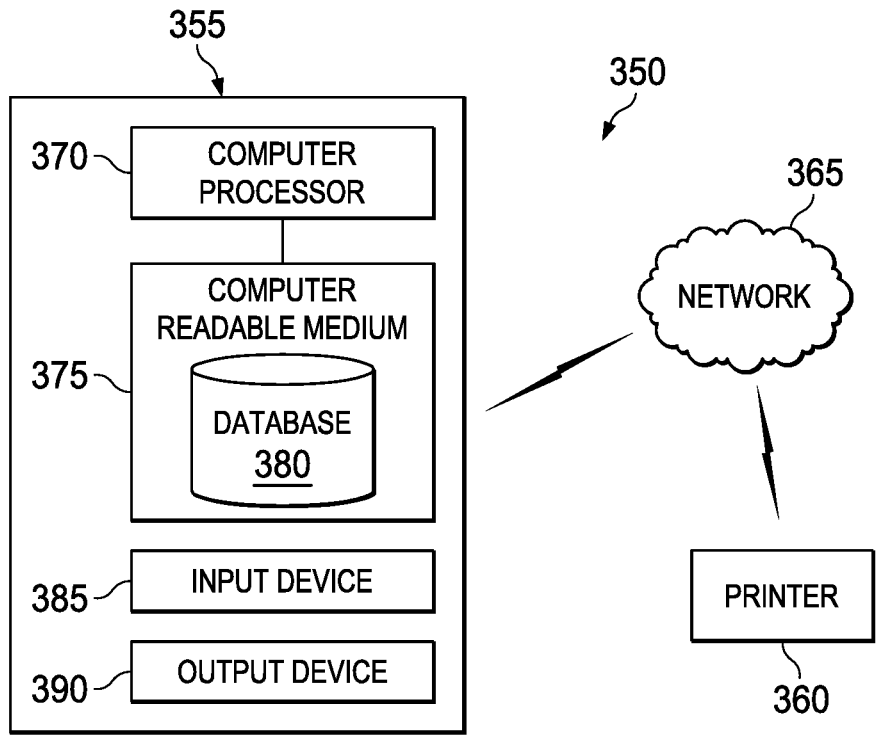
FIG. 8 illustrates an additive manufacturing system, according to an exemplary embodiment.

In an exemplary embodiment and as shown in FIG. 8, a downhole tool printing system 350 includes one or more computers 355 and a printer 360 that are operably coupled together, and in communication via a network 365. In one or more exemplary embodiments, the member 155 may be manufactured using the downhole tool printing system 350. In one or more exemplary embodiments, the one or more computers 355 include a computer processor 370 and a computer readable medium 375 operably coupled thereto. In one or more exemplary embodiments, the computer processor 370 includes one or more processors. Instructions accessible to, and executable by, the computer processor 370 are stored on the computer readable medium 375. A database 380 is also stored in the computer readable medium 375. In one or more exemplary embodiments, the computer 355 also includes an input device 385 and an output device 390. In one or more exemplary embodiments, web browser software is stored in the computer readable medium 375. In one or more exemplary embodiments, three dimensional modeling software is stored in the computer readable medium. In one or more exemplary embodiments, software that includes advanced numerical methods for topology optimization, which assists in determining flow path or acicular member shape, flow path or acicular member size distribution, and flow path or acicular member density distribution or other topological features in the member 155, is stored in the computer readable medium. In one or more exemplary embodiments, software involving finite element analysis and topology optimization is stored in the computer readable medium 375. In one or more exemplary embodiments, any one or more constraints are entered in the input device 385 such that the software aids in the design on the member 155 in which specific portions of the body of the member 155 remain solid (i.e., no flow paths or acicular members are formed). In one or more exemplary embodiments, the input device 385 is a keyboard, mouse, or other device coupled to the computer 355 that sends instructions to the computer 355. In one or more exemplary embodiments, the input device 385 and the output device 390 include a graphical display, which, in several exemplary embodiments, is in the form of, or includes, one or more digital displays, one or more liquid crystal displays, one or more cathode ray tube monitors, and/or any combination thereof. In one or more exemplary embodiments, the output device 390 includes a graphical display, a printer, a plotter, and/or any combination thereof. In one or more exemplary embodiments, the input device 385 is the output device 390, and the output device 390 is the input device 385. In several exemplary embodiments, the computer 355 is a thin client. In several exemplary embodiments, the computer 355 is a thick client. In several exemplary embodiments, the computer 355 functions as both a thin client and a thick client. In several exemplary embodiments, the computer 355 is, or includes, a telephone, a personal computer, a personal digital assistant, a cellular telephone, other types of telecommunications devices, other types of computing devices, and/or any combination thereof. In one or more exemplary embodiments, the computer 355 is capable of running or executing an application. In one or more exemplary embodiments, the application is an application server, which in several exemplary embodiments includes and/or executes one or more web-based programs, Intranet-based programs, and/or any combination thereof. In one or more exemplary embodiments, the application includes a computer program including a plurality of instructions, data, and/or any combination thereof. In one or more exemplary embodiments, the application is written in, for example, HyperText Markup Language (HTML), Cascading Style Sheets (CSS), JavaScript, Extensible Markup Language (XML), asynchronous JavaScript and XML (Ajax), and/or any combination thereof.

In one or more exemplary embodiments, the printer 360 is a three-dimensional printer. In one or more exemplary embodiments, the printer 360 includes a layer deposition mechanism for depositing material in successive adjacent layers; and a bonding mechanism for selectively bonding one or more materials deposited in each layer. In one or more exemplary embodiments, the printer 360 is arranged to form a unitary printed body by depositing and selectively bonding a plurality of layers of material one on top of the other. In one or more exemplary embodiments, the printer 360 is arranged to deposit and selectively bond two or more different materials in each layer, and wherein the bonding mechanism includes a first device for bonding a first material in each layer and a second device, different from the first device, for bonding a second material in each layer. In one or more exemplary embodiments, the first device is an ink jet printer for selectively applying a solvent, activator or adhesive onto a deposited layer of material. In one or more exemplary embodiments, the second device is a laser for selectively sintering material in a deposited layer of material. In one or more exemplary embodiments, the layer deposition means includes a device for selectively depositing at least the first and second materials in each layer. In one or more exemplary embodiments, any one of the two or more different materials may be Acrylonitrile-Butadiene-Styrene or ABS plastic, Polylactic acid or PLA, polyamide, aluminum, glass filled polyamide, stereolithography materials, silver, titanium, steel, wax, photopolymers, polycarbonate, and a variety of other materials. In one or more exemplary embodiments, the printer 360 may involve fused deposition modeling, selective laser sintering, and/or multi jet modeling. In operation, the computer processor 370 executes a plurality of instructions stored on the computer readable medium 375. As a result, the computer 355 communicates with the printer 360, causing the printer 360 to manufacture the member 155 or at least a portion thereof, such as the screen 165. In one or more exemplary embodiments, manufacturing the member 155 using the system 350 results in an integrally formed member 155.

Figure 9:
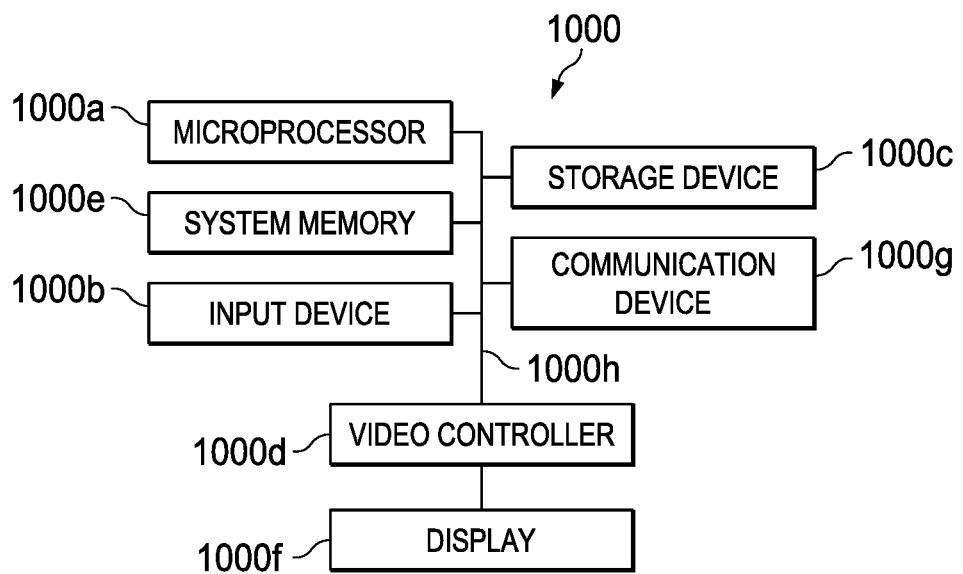
FIG. 9 is a diagrammatic illustration of a node for implementing one or more exemplary embodiments of the present disclosure, according to an exemplary embodiment.

In one or more exemplary embodiments, as illustrated in FIG. 9 with continuing reference to FIGS. 1-8, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In one or more exemplary embodiments, the computer readable medium is a non-transitory tangible media. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, personal digital assistants ("PDAs"), smartphones and cell phones.

In several exemplary embodiments, the one or more computers 355, the printer 360, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, one or more computers 355, and the printer 360 and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In one or more exemplary embodiments, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In one or more exemplary embodiments, a data structure may provide an organization of data, or an organization of executable code.

In several exemplary embodiments, the network 365, and/or one or more portions thereof, may be designed to work on any specific architecture. In one or more exemplary embodiments, one or more portions of the network 365 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In one or more exemplary embodiments, the data contained in the location of a character file can be mapped to a field in a second table. In several exemplary embodiments, the physical location of the database is not limiting, and the database may be distributed. In one or more exemplary embodiments, the database may exist remotely from the server, and run on a separate platform. In one or more exemplary embodiments, the database may be accessible across the Internet. In several exemplary embodiments, more than one database may be implemented.

In several exemplary embodiments, a computer program, such as a plurality of instructions stored on a computer readable medium, such as the computer readable medium 375, the system memory 1000e, and/or any combination thereof, may be executed by a processor to cause the processor to carry out or implement in whole or in part the operation of the system 350, and/or any combination thereof. In several exemplary embodiments, such a processor may include one or more of the computer processor 370, the processor 1000a, and/or any combination thereof. In several exemplary embodiments, such a processor may execute the plurality of instructions in connection with a virtual computer system.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In one or more exemplary embodiments, the instructions may be generated, using in part, advanced numerical method for topology optimization to determine optimum flow path or acicular member shape, flow path or acicular member size and distribution, and flow path or acicular member density distribution for the plurality of flow paths 215 or the plurality of acicular members 270, or other features.

During operation of the system 350, the computer processor 370 executes the plurality of instructions that causes the manufacture of the member 155 using additive manufacturing. Thus, the member 155 is at least partially manufactured using an additive manufacturing process. Manufacturing the member 155 via machining forged billet stock or using multi-axis milling processes often limits the geometries and design of the member 155. Thus, with additive manufacturing, complex geometries—such as the plurality of flow paths 215 and/or the plurality of acicular members 270—are achieved or allowed, which results in the creation of a high angle screen. In one or more exemplary embodiments, the use of three-dimensional, or additive, manufacturing to manufacture downhole equipment, such as the member 155, will allow increased flexibility in the strategic placement of material to retain strength and support of the screen 165 but increasing the porosity and ability to filter debris from the fluid flowing through the screen 165.

In an exemplary embodiment, at least a portion of the member 155 is manufactured by using an additive manufacturing process, which allows for intricate screen shapes or the high-angle screen as shown in FIGS. 4-7 since the angle 260 is greater than 30 degrees. Use of the member 155 results in higher porosity, which enables higher fluid flow through the member 155, more debris holding, such as fines holding, by the member 155. In an exemplary embodiment, at least a portion of the screen 165 is manufactured by using an additive manufacturing process and is inserted or otherwise coupled to the member 155.

In an exemplary embodiment, the member 155 is a metal tubular member although the member 155 may be composed of a non-metal material, such as a plastic or composite material.

Thus, a screen assembly for a production tool has been described. Embodiments of the screen assembly may generally include a tubular member defining an interior passageway; and a plurality of flow paths defined by the tubular member, the plurality of flow paths forming a screen portion that permits fluid flow through the screen portion and into the interior passageway; wherein the plurality of flow paths form a fractal flow network. Likewise, an apparatus has been described. Embodiments of the apparatus may generally include a non-transitory computer readable medium; and a plurality of instructions stored on the non-transitory computer readable medium and executable by one or more processors, the plurality of instructions including instructions that cause the manufacture of a screen assembly for a production tool, the screen assembly including a tubular member defining an interior passageway; and a plurality of flow paths defined by the tubular member, the plurality of flow paths forming a screen portion that permits fluid flow through the screen portion and into the interior passageway; wherein the plurality of flow paths form a fractal flow network. Any of the foregoing embodiments may include any one of the following elements, alone or in combination with each other:

A first flow path of the plurality of flow paths extends through a first layer of the tubular member; wherein the first layer of the tubular member is at least partially defined by an exterior surface of the tubular member.

A second flow path of the plurality of flow paths extends through a second layer of the tubular member; wherein the second layer of the tubular member extends between the first layer and the interior passageway;

The first flow path has a first inner circumference.

The second flow path a second inner circumference that is greater than the first inner circumference.

The first flow path is in fluid communication with the second flow path.

A third flow path of the plurality of flow paths extends through the first layer of the tubular member.

The third flow path has a third inner circumference that is different than the first inner circumference.

The third flow path is in fluid communication with the second flow path.

The screen portion extends around the circumference of the tubular member.

The screen portion is one screen portion of a plurality of screen portions, the screen portions spaced circumferentially and longitudinally along the tubular member.

The number of flow paths extending through the first section is greater than the number of flow paths extending through the second section.

At least a portion of the screen assembly is manufactured by using an additive manufacturing process.

Thus, a screen assembly for a production tool has been described. Embodiments of the assembly generally include a tubular member defining an interior passageway, the tubular member including a screen portion that permits fluid flow through an entry threshold of the screen portion and into the interior passageway; wherein the screen portion includes a plurality of acicular members integrally formed in the tubular member; wherein an outer circumference circumscribes the plurality of acicular members; wherein at least a portion of the entry threshold lies in a first plane that intersects the outer circumference of the tubular member at a tangent point at which the first plane is tangent to the outer circumference; wherein a first acicular member in the plurality of acicular members has a longitudinal axis that passes through the tangent point; wherein the longitudinal axis intersects the first plane on a second plane that is perpendicular to the longitudinal center axis of the tubular member to define a first angle between the axis and the first plane; and wherein the first angle is greater than 30 degrees and less than 90 degrees so that the first acicular member facilitates filtering the fluid flow by the plurality acicular members. For any of the foregoing embodiments, the method may include any one of the following limitations, alone or in combination with each other:

A second acicular member in the plurality of acicular members has a longitudinal axis that intersects the longitudinal axis of the first acicular member to define a second angle that is greater than 10 degrees and less than 90 degrees.

At least a portion of the screen assembly is manufactured by using an additive manufacturing process.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

What is claimed is:

1. A screen assembly for a production tool, the screen assembly comprising:

a tubular member defining an interior passageway; and a plurality of flow paths defined by the tubular member, the plurality of flow paths forming a screen portion that permits fluid flow through the screen portion and into the interior passageway;

wherein the plurality of flow paths form a flow network;

wherein the tubular member is manufactured by using an additive manufacturing process such that the tubular member is a unitary printed body;

wherein the tubular member comprises a plurality of screen portions spaced circumferentially and longitudinally along the tubular member; and wherein portions of the tubular member between the plurality of screen portions are solid in an entire thickness direction thereof.

2. The screen assembly of claim 1, wherein a screen portion extends around an outer circumference of the tubular member.

3. The screen assembly of claim 1, wherein a first flow path of the plurality of flow paths extends through a first layer of the tubular member;

wherein the first layer of the tubular member is at least partially defined by an exterior surface of the tubular member;

wherein a second flow path of the plurality of flow paths extends through a second layer of the tubular member;

wherein the second layer of the tubular member extends between the first layer and the interior passageway;

wherein the first flow path has a first inner circumference; and wherein the second flow path has a second inner circumference that is greater than the first inner circumference.

4. The screen assembly of claim 3, wherein a number of flow paths extending through the first layer is greater than a number of flow paths extending through the second layer.

5. The screen assembly of claim 3, wherein the first flow path is in fluid communication with the second flow path.

6. The screen assembly of claim 3, wherein a third flow path of the plurality of flow paths extends through the first layer of the tubular member; and wherein the third flow path has a third inner circumference that is different than the first inner circumference.

7. The screen assembly of claim 6, wherein the third flow path is in fluid communication with the second flow path.

8. The screen assembly of claim 1, wherein the flow network comprises:

a first layer at least partially defined by an exterior surface of the tubular member;

a second layer extending between the first layer and the interior passageway;

a third layer extending between the second layer and the interior passageway; and a fourth layer extending between the third layer and the interior passageway;

wherein the first layer has a first number of flow paths extending through the first layer, the second layer has a second number of flow paths extending through the second layer, the third layer has a third number of flow paths extending through the third layer, and the fourth layer has a fourth number of flow paths extending through the fourth layer; and wherein the first number of flow paths is greater than the second number of flow paths, the second number of flow paths is greater than the third number of flow paths, and the third number of flow paths is greater than the fourth number of flow paths.

9. The screen assembly of claim 8, wherein the plurality of flow paths have a circular cross-section.

10. The screen assembly of claim 1, wherein the tubular member is made of a metal.

11. An apparatus comprising:

a non-transitory computer readable medium; and a plurality of instructions stored on the non-transitory computer readable medium and executable by one or more processors, the plurality of instructions comprising:

instructions that cause the manufacture of a screen assembly for a production tool, the screen assembly comprising:

a tubular member defining an interior passageway; and a plurality of flow paths defined by the tubular member, the plurality of flow paths forming a screen portion that permits fluid flow through the screen portion and into the interior passageway;

wherein the plurality of flow paths form a flow network;

wherein the tubular member is manufactured by using an additive manufacturing process such that the tubular member is a unitary printed body;

wherein the tubular member comprises a plurality of screen portions spaced circumferentially and longitudinally along the tubular member; and wherein portions of the tubular member between the plurality of screen portions are solid in an entire thickness direction thereof.

12. The apparatus of claim 11, wherein a first flow path of the plurality of flow paths extends through a first layer of the tubular member;

wherein the first layer of the tubular member is at least partially defined by an exterior surface of the tubular member;

wherein a second flow path of the plurality of flow paths extends through a second layer of the tubular member;

wherein the second layer of the tubular member extends between the first layer and the interior passageway;

wherein the first flow path has a first inner circumference; and wherein the second flow path has a second inner circumference that is greater than the first inner circumference.

13. The apparatus of claim 12, wherein the first flow path is in fluid communication with the second flow path.

14. The apparatus of claim 12, wherein a third flow path of the plurality of flow paths extends through the first layer of the tubular member; and wherein the third flow path has a third inner circumference that is different than the first inner circumference.

15. The apparatus of claim 14, wherein the third flow path is in fluid communication with the second flow path.

16. The apparatus of claim 12, wherein a screen portion extends around an outer circumference of the tubular member.

* * * * *